United States Patent [19]
Joss et al.

[11] Patent Number: 5,746,307
[45] Date of Patent: May 5, 1998

[54] SWITCH ASSEMBLY FOR A PORTABLE RADIO

[75] Inventors: Steve M. Joss, Pompano Beach, Fla.; Tyler D. Jensen, San Diego, Calif.; Laurence E. Marvet, Plantation, Fla.; Julio C. Castañeda, Coral Springs, Fla.; David Auld, Lake Park, Fla.; Steven J. Finch, Plantation, Fla.

[73] Assignee: Motorola, Inc., Schaumburg, Ill.

[21] Appl. No.: 835,365

[22] Filed: Apr. 7, 1997

[51] Int. Cl.$^6$ ............................................. H01H 9/02
[52] U.S. Cl. ........................ 200/303; 200/293; 200/330; 200/512
[58] Field of Search ..................... 200/303, 329, 200/330, 283, 284, 512, 517, 520, 331

[56] References Cited

U.S. PATENT DOCUMENTS

| | | | |
|---|---|---|---|
| 4,845,325 | 7/1989 | Burchett et al. | 200/302.2 |
| 5,213,204 | 5/1993 | Sommer | 200/303 |
| 5,618,212 | 4/1997 | Moore | 200/512 |
| 5,629,504 | 5/1997 | Chang | 200/303 |

*Primary Examiner*—David J. Walczak
*Attorney, Agent, or Firm*—Barbara R. Doutre

[57] ABSTRACT

The PTT assembly (100) self locates and then locks a back support plate (106) and switches (146, 148) directly to an inner surface (134) of a housing wall (132). On the outer surface (136) of the housing wall (132), keypad plungers (116) self locate through holes (140) in the housing wall. The perimeter of the keypad itself is retained by a bezel (110) that snaps into the housing (132). A hook (130) extends from the bezel (110) to lock and fix the travel distance of the plungers (116) to the switches (146, 148). With the back support plate (106) firmly in place, the keypad actuation force remains consistent since the travel distance of the plungers (116) to the switches (146, 148) is fixed by the hook (130) length. Additionally, the back support plate (106) supports the switches without bowing under the applied plunger force further ensuring a consistent actuation force.

9 Claims, 3 Drawing Sheets

SWITCH ASSEMBLY FOR A PORTABLE RADIO

TECHNICAL FIELD

This invention relates in general to portable radios and more specifically to push-to-talk switch assemblies used in portable radios.

BACKGROUND

Push-to-talk (PTT) switches allow users to key up a portable radio and transmit communications. These switches are typically formed of a switch, such as a popple switch, which is provided to the interior of the radio housing and can be actuated by depressing a push-to-talk lever mounted on the outside of the radio housing. Standard push-to-talk switch assemblies are plagued with alignment problems. Alignment problems are created by large tolerance stack-ups between the actuation plunger, or lever, and the popple dome switch. As the number of parts in the PTT assembly is increased so are the tolerance variations. Typically, there is both a housing assembly and a PTT subassembly. Misalignment may also occur because of improper assembly of the PTT subassembly into the housing assembly. One problem encountered with the alignment variation is that the force needed to actuate the switch will vary between radios. In some cases, improper alignment of the plunger will prevent the switch from being activated.

Another problem encountered in many PTT designs is that the force needed to actuate the PTT button, or key, will vary depending on the travel distance of the keypad plungers to the switches. This varying force may leave the use questioning if the switch was actuated when the button is depressed.

Accordingly, there is a need for an improved PTT assembly for portable radio products.

DETAILED DESCRIPTION OF THE PREFERRED EMBODIMENT

Figure 1:
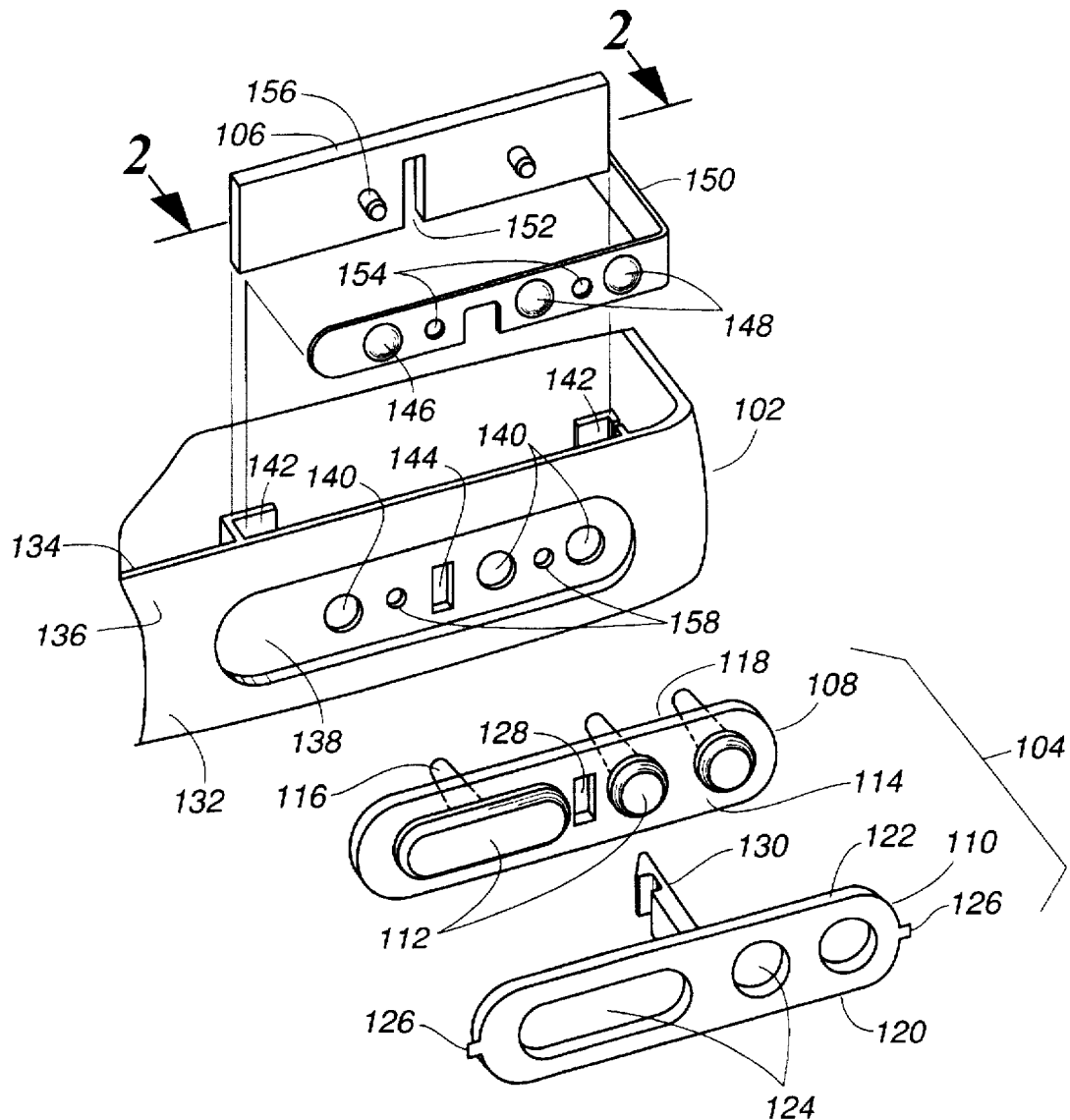
FIG. 1 shows an exploded view of the push-to-talk switch assembly in accordance with the present invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is shown an exploded view of a push-to-talk switch assembly 100 in accordance with the present invention. Assembly 100 includes a housing 102, a bezel keypad assembly 104, and a back support plate 106. The bezel keypad assembly 104 consists of keypad 108 and bezel 110. Keypad 108 is formed of a flexible membrane having keys, or buttons, 112 molded on a first surface 114. Typically, the actual push-to-talk key is the largest of the plurality of keys 112 shown, however the PTT assembly of the present invention is applicable to all keys mounted on the assembly, such as volume up or volume down keys. Each key 112 has a corresponding actuator, or plunger, 116 formed on a second surface 118 of the keypad. Keypad 108 also includes an opening 128 through the first and second surfaces 114, 118. The bezel 110 is formed of a resilient material and has first and second sides 120, 122. The bezel includes through holes 124 for receiving the keys 112 of the keypad membrane. In accordance with the present invention, a hook 130 is coupled to the second side 122 of the bezel 110. The bezel 110 preferably includes tabs 126 for snap fitting the bezel keypad assembly 104 into the housing 102. The bezel keypad assembly 104 is assembled first by inserting keypad 108 into a recessed cavity (not shown) on the second side of bezel 110 thus seating the keypad 108 into the bezel such that the hook 130 protrudes through the opening 128 of the membrane, and the keys are seated in the through holes 124.

The housing 102 has a side wall 132 with inner and outer surfaces, (also referred to as inner and outer side walls) 134, 136 respectively. The housing 102 includes a recessed area 138 formed within the outer side surface 136. The housing 102 includes a plurality of holes 140 extending through side wall 132 within recessed area 138, one hole corresponding to each plunger of each key 112 and another hole 144 corresponding to the hook 130. The housing 102 further includes a retaining wall, preferably first and second retaining walls 142, coupled to the inner surface 134. The bezel keypad assembly 104 is snap fitted into the recessed area 138 of the housing 102, preferably through tabs 126, such that the plungers 116 align with the holes 140 and the hook 130 protrudes through its corresponding hole 144.

The back support plate 106 includes a switch 146, such as a popple dome switch, for the PTT function, as well as any other switches 148 necessary to the application, such as volume up/down. These switches 146, 148 are preferably mounted to the back support plate 106 through an adhesively backed flex 150. The flex 150 includes appropriate interconnects for connecting the switches to appropriate circuits. The flex 150 is preferably aligned onto the back support plate 106 using alignment holes 154 corresponding to raised alignment features, such as nibs, 156 on the back support plate. In accordance with the present invention, the back support plate also includes an aperture 152 for slideably engaging the hook 130.

With the switches 146, 148 coupled to the back support plate 106, the back support plate 106 is then slideably inserted between the inner side surface 134 of the housing 102 and the first and second retaining walls 142. In accordance with the present invention, the aperture 152 slideably engages the hook 130 of the bezel 110 so as to restrain the back support plate 106 within the support walls 142 and the inner side surface 134 of the housing 102. The back support plate is preferably snap fitted into place through the raised alignment features 156 and corresponding alignment holes 158 located in side wall 132.

The PTT assembly 100 described by the invention self locates by snap fitting the bezel keypad assembly 104 into the housing 102 thereby aligning plungers 116 and hook 130 with corresponding holes in the housing 132. Then, by using hook 130 to lock the back support plate 106 and switches 146, 148 directly to the inner surface 134 of the housing wall 132, the keypad plungers 116 are properly aligned with their respective switches.

Figure 2:
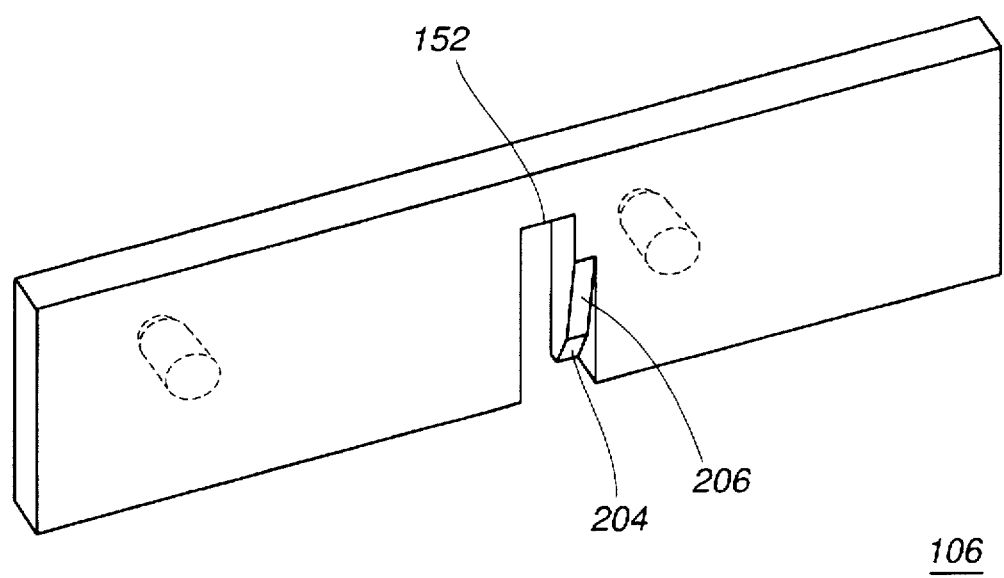
FIG. 2 shows a the back view of the back support plate of FIG. 1 accordance with the present invention.

The PTT assembly 100 described by the invention uses the hook 130 that extends from the bezel 110 to lock and fix the travel distance of the plungers 116 to the switches 146, 148. FIG. 2 shows the back view of back support plate 106, which preferably includes an angled wedge 202, or angled depression, about the aperture 152 for engaging the hook 130. The angled wedge 202 preferably has two levels of depressions 204, 206 to act as a ramp to ease the engagement of hook 130 as the back support plate 106 is slid over the hook. With the back support plate 106 firmly in place, the keypad actuation force remains consistent since the travel distance of the plunger to the switches 146, 148 is fixed by the hook 130 length. Additionally, the back support plate 106 supports the switches without bowing under the applied plunger force further ensuring a consistent actuation force.

Figure 3:
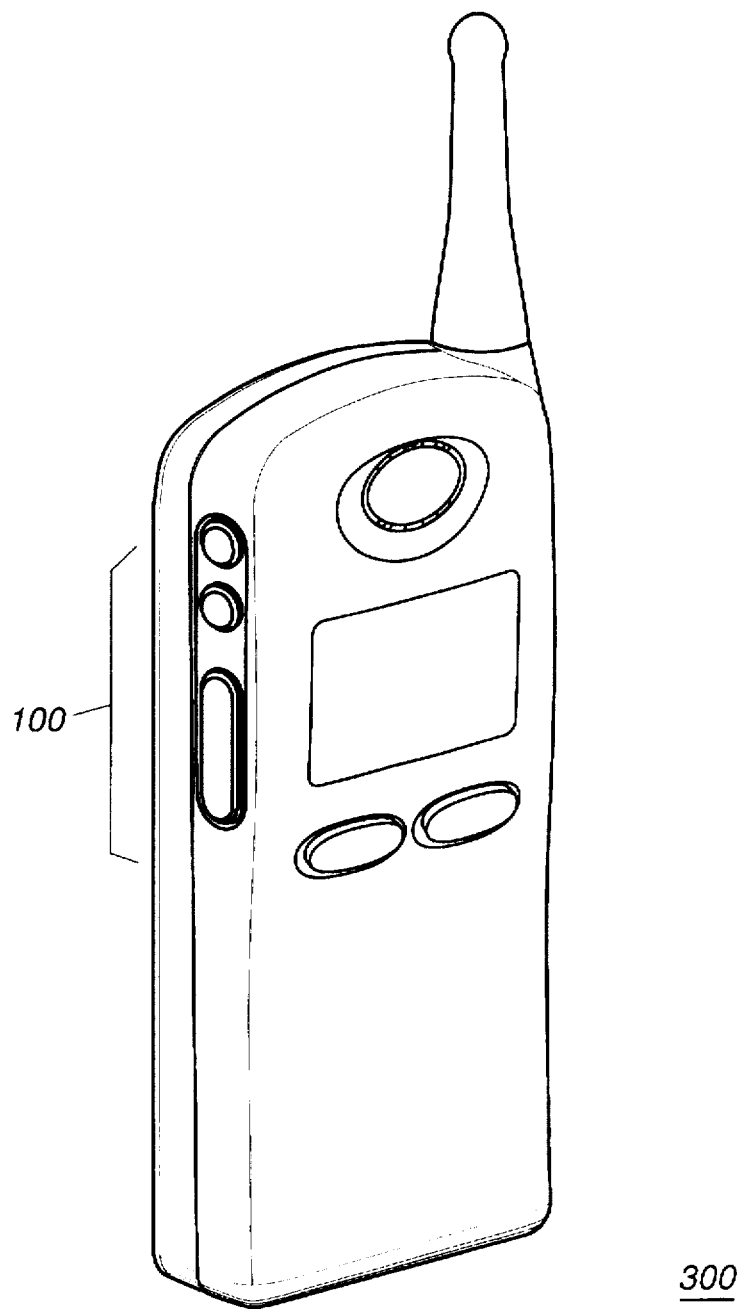
FIG. 3 shows a radio utilizing the PTT assembly in accordance with the present invention.

FIG. 3 shows a portable radio 300 utilizing the PTT assembly 100 described by the invention. The PTT assembly 100 described by the invention reduces alignment and tolerance stack up issues while providing for consistent travel distance between the plunger and the switch, making the assembly well suited for thin-walled housing applications. Improved manufacturability and improved user interface are also benefits which have been achieved.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A push-to-talk switch assembly, comprising:
   a housing having a side wall with inner and outer surfaces, the housing having first and second holes through the side wall;
   first and second retaining walls coupled to the inner surface;
   a bezel keypad assembly formed of a bezel retaining a keypad and having a hook, the bezel keypad assembly snap fitting onto the outer surface of the housing such that the hook protrudes through the first hole into the housing, the keypad including an actuator protruding through the second hole into the housing; and
   a back support plate slideably inserted between the inner surface of the side wall and the first and second retaining walls, the back support plate including an aperture for sliding over the hook and engaging the hook, the back support plate snap fitting into place between the inner surface of the side wall and the first and second retaining walls, the back support plate including a switch, the switch aligning with the actuator.

2. A push-to-talk switch assembly for a portable radio, comprising:
   a radio housing having inner and outer side walls, the radio housing including:
      a recessed area formed within the outer side wall, the recessed area including first and second holes;
      a retaining wall coupled to the inner side wall;
   a membrane having first and second surfaces, the membrane including:
      a key formed on the first surface;
      a plunger corresponding to the key formed on the second surface;
      an opening formed through the first and second surfaces;
   a bezel having first and second sides, the bezel including:
      a recessed area formed on the second side for receiving the membrane and forming a bezel keypad assembly;
      a through hole formed through the first and second sides for receiving the key of the membrane;
      a hook coupled to the second side, the hook protruding through the opening of the membrane when the membrane is seated in the bezel;
      first and second tabs coupled to the bezel;
   the first and second tabs of the bezel keypad assembly snap fitting into the recessed area of the housing such that the plunger aligns with the first hole of the housing and the hook protrudes through the second hole of the housing; and
   a back support plate slideably inserted between the inner side wall of the radio housing and the retaining wall, the back support plate including:
      an aperture for slideably engaging the hook of the bezel so as to restrain the back support plate within the retaining wall and the inner side wall of the radio housing;
      a switch aligning with the plunger when the back support plate is inserted between the inner side wall of the radio housing and the retaining wall.

3. A push-to talk switch assembly as described in claim 2, wherein the switch comprises a popple dome switch mounted to the back support plate through a flex, the popple dome switch aligning with the plunger of the bezel keypad assembly.

4. A push-to talk switch assembly as described in claim 3, further comprising:
   a raised alignment feature coupled to the back support plate;
   an alignment hole through the flex for aligning the flex onto the back support plate about the raised alignment feature; and
   another alignment hole in the radio housing wall for receiving the alignment feature of the back support plate.

5. A push-to talk switch assembly as described in claim 2, wherein the back support plate includes an angled wedge about the aperture for engaging the hook.

6. A push-to-talk switch assembly for a portable radio, comprising:
   a bezel keypad assembly, comprising:
      a flexible membrane having first and second surfaces, the first surface providing as a plurality of keys forming a keypad, each key of the keypad having a corresponding plunger formed on the second surface of the flexible membrane and the flexible membrane including an opening;
      a bezel for receiving the flexible membrane, the bezel having a plurality of through hole holes within which the plurality of keys are seated, the bezel including a hook, the hook protruding through the flexible membrane's opening;
   a radio housing having a wall, the wall having inner and outer surfaces, the outer surface having a recessed area for receiving the bezel keypad assembly, the wall including a plurality of holes aligning with the plurality of plungers of the keypad and a single hole through which the hook of the bezel protrudes, the inner surface of the wall also having first and second retaining walls; and
   a back support plate including an aperture, the back support plate slidably fitting between the inner surface of the radio wall and the first and second retaining walls, the aperture slideably engaging the hook to restrain the back support plate within the inner surface wall and the first and second retaining walls, the back support plate including a plurality of switches aligning with the plungers of the keypad.

7. A push-to talk switch assembly as described in claim 6, wherein the plurality of switches comprise a popple dome switches mounted to the back plate through a flex, the popple dome switches aligning with the plurality of plungers of the bezel assembly.

8. A push-to talk switch assembly as described in claim 6, further comprising:

a plurality of raised alignment features coupled to the back support plate;

a plurality of alignment holes formed through the flex for aligning the flex onto the back support plate about the plurality of raised alignment features;

and a plurality of radio housing alignment holes formed in the radio housing wall for receiving the plurality of raised alignment features of the back support plate.

9. A push-to talk switch assembly as described in claim 6, wherein the back support plate includes an angled wedge about the aperture for slidably engaging the hook.

* * * * *